United States Patent [19]

Ball

[11] 4,403,673

[45] Sep. 13, 1983

[54] POWERED VEHICLE

[76] Inventor: Douglas Ball, 190 Senneville Rd., Senneville, Quebec, Canada, H9X 1B9

[21] Appl. No.: 222,939

[22] Filed: Jan. 6, 1981

[51] Int. Cl.$^3$ .............................................. B62D 61/08

[52] U.S. Cl. ............................. 180/214; 180/DIG. 3; 280/62; 297/DIG. 4

[58] Field of Search ......... 180/211, 213, 214, DIG. 3; 280/62; 297/DIG. 4; 293/127

[56] References Cited

U.S. PATENT DOCUMENTS

| | | | |
|---|---|---|---|
| 2,312,052 | 2/1943 | Premo | 293/127 |
| 2,468,801 | 5/1949 | Beall | 180/DIG. 3 |
| 2,577,416 | 12/1951 | Geisse | 280/62 |
| 2,657,938 | 11/1953 | Browne et al. | 280/62 |
| 2,892,506 | 6/1959 | Slater | 180/DIG. 3 |
| 3,213,957 | 10/1965 | Wrigley | 297/DIG. 4 |
| 3,749,192 | 7/1973 | Karchak, Jr. et al. | 180/DIG. 3 |
| 3,905,436 | 9/1975 | Karchak, Jr. et al. | 297/DIG. 4 |
| 4,037,676 | 7/1977 | Ruse | 180/DIG. 3 |
| 4,165,127 | 8/1979 | Vago | 297/DIG. 4 |

FOREIGN PATENT DOCUMENTS

| | | | |
|---|---|---|---|
| 117125 | 7/1918 | United Kingdom | 180/211 |
| 316348 | 7/1929 | United Kingdom | 180/213 |
| 492352 | 12/1936 | United Kingdom | 180/211 |

*Primary Examiner*—Joseph F. Peters, Jr.
*Assistant Examiner*—Ross Weaver
*Attorney, Agent, or Firm*—Larson and Taylor

[57] ABSTRACT

A powered vehicle suitable for use as a wheel chair is disclosed. The vehicle has rear caster wheels which can swivel freely or one can be prevented from swivelling which allows the vehicle to manoeuvre in confined spaces and around obstacles. The vehicle has at least one steerable central front wheel which is steerable at least about 90° on either side of a straight ahead direction. A power drive operates the front wheel in forward and reverse directions. At least two rear swivel caster wheels form a tricycle arrangement with the central front wheel, each of the caster wheels having a free position wherein each caster wheel is free to swivel in any direction, at least one caster wheel having a locked position, wherein the caster wheel is lockable in the straight ahead direction, and a remote control selector is provided to change from the free position to the locked position of the caster wheel.

8 Claims, 5 Drawing Figures

POWERED VEHICLE

The present invention relates to powered vehicles. More specifically the present invention relates to a powered vehicle having a tricycle arrangement suitable for use as a wheelchair.

Many tricycle vehicles have a front wheel which is powered and steerable and two free rear wheels which have fixed positions. In such a vehicle the two rear wheels track behind the front wheel to give a manoeuvrable platform whose direction can be controlled by swivelling the front wheel. One problem that exists with such a tricycle vehicle is that it is difficult to manoeuvre when in confined spaces or around obstructions.

I have found that by incorporating swivel caster wheels for the rear wheels of a tricycle arrangement on a powered vehicle, the vehicle has a smaller turning circle than with fixed position wheels and the caster wheels permit the rear of the vehicle to move sideways when contacting an object, thus, one may more easily manoeuvre a vehicle in confined spaces and around obstructions. In the case of a wheelchair, the front wheel can be driven, or alternatively the occupant can push or pull the wheelchair from a fixed wall or object in a room to position the wheelchair exactly where needed. Furthermore, the occupant may pivot the wheelchair about the front drive wheel. Other benefits that occur with swivel caster wheels for the rear wheels include a reduced tendency for a vehicle to tip when turning sharply and an entertaining handling behavior simulating a sideways skidding effect. The vehicle may also be briefly moved sideways by actuating the front drive wheel while at 90° to one side, and simultaneously pushing or pulling from a fixed object.

In a preferred embodiment, the rear caster wheels have a limited swivel movement. By having a limited swivel movement on the rear caster wheels one can prevent a vehicle spinning completely when cornering at speed. There is still a requirement to have a fixed rear wheel mode in the tricycle arrangement for normal travelling so that the rear wheels track behind the front steering wheel.

It is an object of the present invention to provide a powered vehicle which has a normal travel mode wherein two rear wheels are in a fixed position and track behind a front steering wheel, and a free mode wherein the rear wheels swivel so that the vehicle may be moved in confined spaces and around obstructions. In a preferred embodiment the vehicle has a limited free mode wherein the rear wheels have a limited swivel so the vehicle commences to spin, simulating a skidding action but cannot spin completely around. Such a vehicle can be a fun vehicle for children, particularly those children who are confined to a wheelchair. In another embodiment, the vehicle may be designed for outdoor use simulating skidding actions for training and entertainment.

The present invention provides a powered vehicle comprising at least one steerable central front wheel, the front wheel being steerable at least about 90° on either side of a straight ahead direction, power means to drive the front wheel in forward and reverse directions, at least two rear swivel caster wheels forming a tricycle arrangement with the central front wheel, each of the caster wheels having a free position wherein each caster wheel is free to swivel in any direction, at least one caster wheel having a locked position wherein the caster wheel is lockable in the straight ahead direction, and remote control selector means to change from the free position to the locked position of the caster wheel.

The present invention also provides a powered wheelchair for indoor use, comprising a tricycle frame with a seat and a footrest, a steerable central front wheel having a tiller steering control handle, the front wheel being steerable at least about 90° on either side of a straight ahead direction, power means to drive the front wheel in forward and reverse directions, two swivel rear caster wheels forming a tricycle arrangement with the central front wheel, each of the caster wheels having a free position, wherein each caster wheel is free to swivel in any direction, an intermediate position wherein each caster wheel has a limited free swivel movement from the normal straight ahead direction, outwards through an angle of approximately 180° to a reverse straight ahead direction, and inwards from the normal straight ahead direction through an angle of approximately 45°, and a locked position wherein each caster wheel is lockable in the straight ahead direction, remote control selector means to determine the free position, intermediate position and locked position of the two caster wheels, front bumper bar attached to the tricycle frame extending beyond the foot rest, and spring loaded side bumpers attached to the tricycle frame.

In drawings which illustrate the embodiments of the invention,

Figure 1:
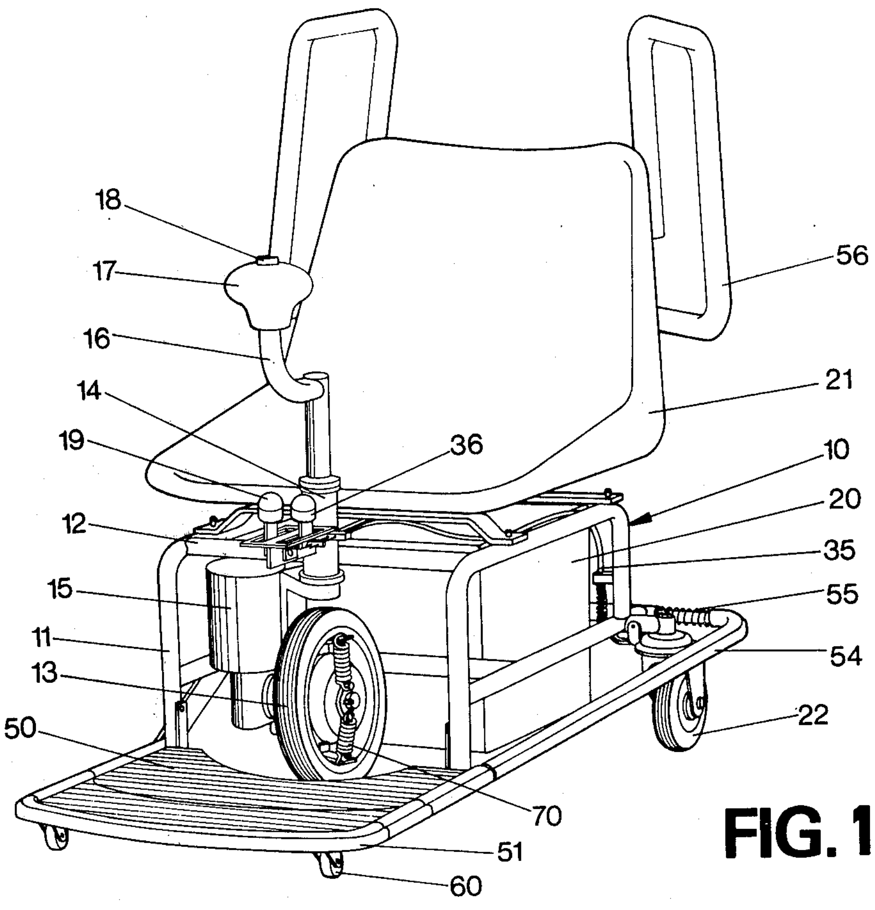
FIG. 1 is an isometric side view of a wheelchair having a tricycle arrangement according to one embodiment of the present invention.
Figure 2:
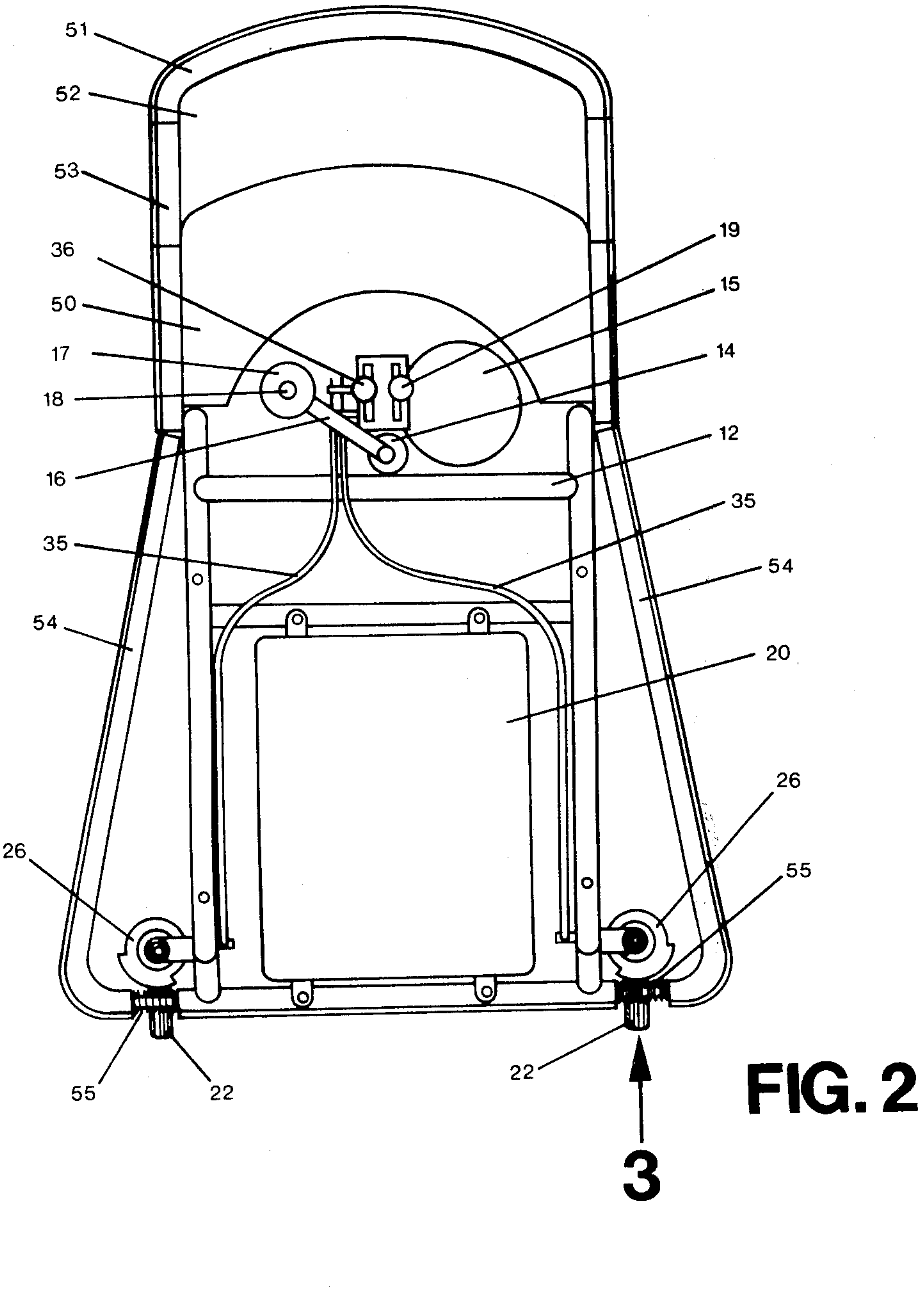
FIG. 2 is a plan view of the wheelchair shown in FIG. 1 with the seat removed.

Referring now to the drawings, a wheelchair 10 is shown in FIGS. 1 and 2 having a rectangular frame 11, with a front cross bar 12 which supports a front steerable wheel 13 at the centre thereof. The front wheel 13 swivels in a central support column 14 and a motor 15 and gear reducer swivel with the front wheel 13 and provide power to the front wheel. A tiller 16 with a steering handle 17 allows the front wheel 13 to be steered at least about 90° on either side of the straight ahead directon. A pushbutton 18 is provided on the steering handle 17 to control the motor 14 to operate the front wheel 13. Off to one side of the central support column 14 supporting the front wheel 13 is a speed control lever 19 which provides fast and slow forward speed and a reverse speed. Power for the motor 15 comes from two batteries in a battery box 20 which is low slung on the frame 11. The battery box 20 is positioned beneath a seat 21. In the configuration shown there are two 12 volt batteries. The batteries are connected in parallel for slow speed, and in series for fast speed. Reverse is provided at slow speed only by reversing polarity to the motor.

Figure 4:
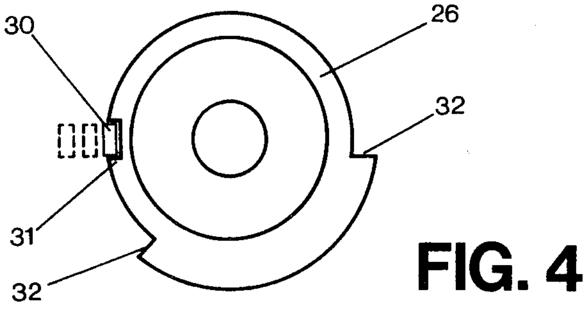
FIG. 4 is a plan view at line 4—4 of FIG. 3.

Two rear swivel casters 22 are positioned at the back of the vehicle thus forming a tricycle arrangement with the front wheel 13. The casters are shown in more detail in FIG. 3. Each wheel 22 is supported by a caster fork 23 with a swivel 24 at the top of the fork 23, connected to the frame 11 by means of nut 25. If there is no restriction the fork 23 swivels completely within the swivel 24 allowing 360° rotation. However, on top of the fork 23 is a cam plate 26 as illustrated in FIG. 4. The cam plate 26 is attached to the fork 23 and swivels with the wheel. A pivoting arm 27 has a link 28 to a pivot position 29 on the frame 11. The pivoting arm 27 has a tab 30 which engages the cam plate 26. The cam plate 26 has a first slot 31 which when engaged by the tab 30 holds the wheel 22 in a fixed position, which is in the straight ahead direction. This provides a locked position, preventing any swivelling action of the wheel 22. When the pivot arm 27 is raised upwards to a second position, the tab 30 allows limited rotation of the cam plate 26 within two shoulders 32 which allows the wheel 22 to swivel from a normal straight ahead direction outwards of the frame 11, through an angle of approximately 180° to a reversed straight ahead direction, and then inwards from the normal straight ahead direction through an angle of a further approximate 45°.

The extent of this limited swivel movement is restricted so that a vehicle will not go into a complete spin, some sideways movement occurs, simulating a skid, and this reduces the tendency for the vehicle to tip. Whereas both rear wheels 22 are shown having a fixed position and an intermediate position, it will be apparent that the vehicle may be controlled perfectly well if only one of the rear caster wheels 22 has a fixed position. The other wheel may be free swivelling for the fixed position, but both caster wheels should have a limited swivel movement in the intermediate position.

Figure 3:
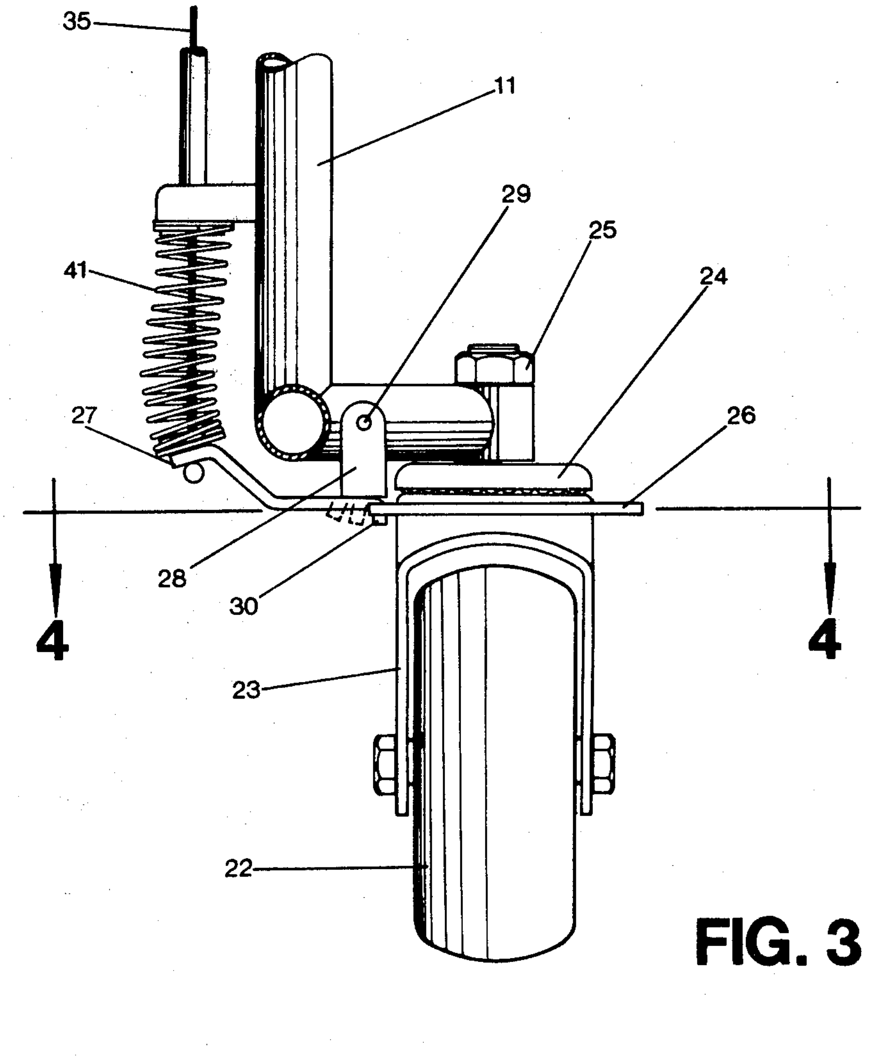
FIG. 3 is an end view of a rear caster wheel shown at arrow 3 of FIG. 2.
Figure 5:
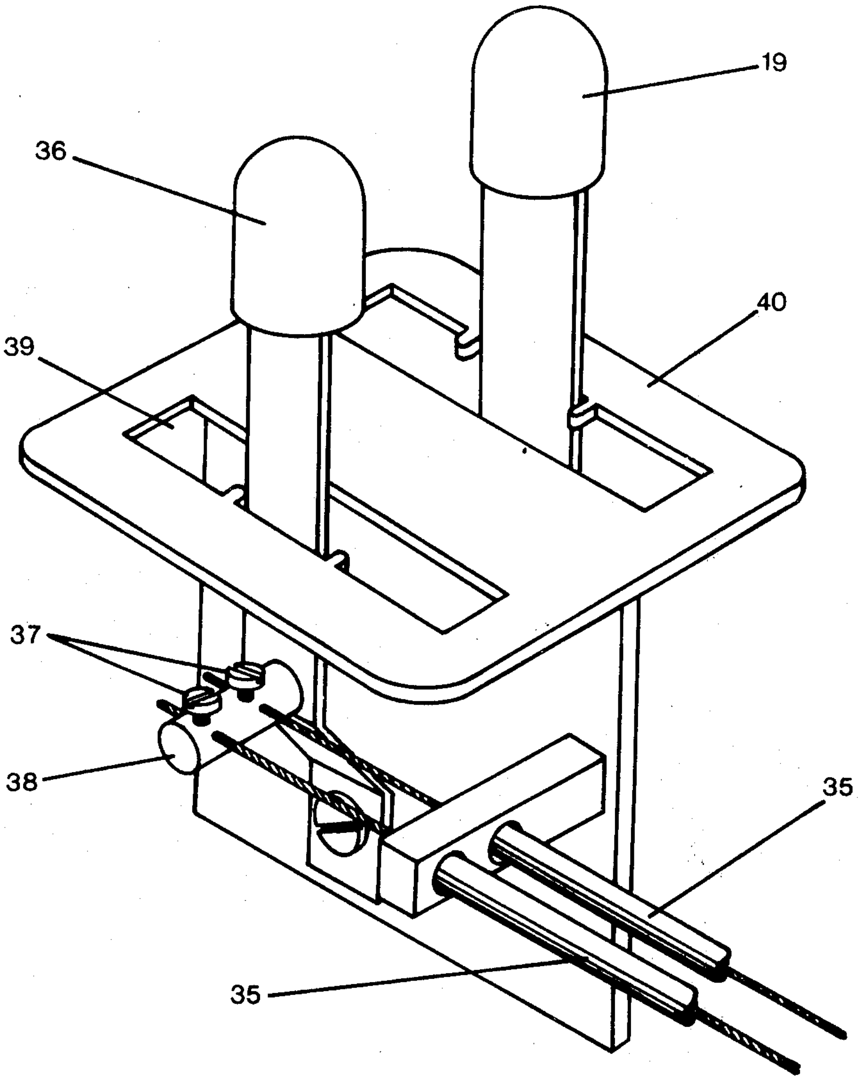
FIG. 5 is an isometric view of a detail showing the lever mechanism to control the caster wheel position.

Although not fully illustrated in FIG. 3, the caster fork 23 is arranged so that the axle of the wheel 22 is not directly under the swivel point but trails when the vehicle is going straight ahead in the normal straight ahead direction. In this manner the rear wheels 22 track behind the front wheel 13 of the vehicle. In the intermediate position for the tab 30 the wheel 22 is allowed to rotate until the tab 30 contacts one of the stops 32. A free position is illustrated in FIG. 4 where the tab 28 is outside the cam plate 26 and allows a swivelling action of 360°. In this way the caster wheel 22 is free to swivel in any direction. The pivoting arm 27 is moved by a cable 35 connected to a lever 36 shown in FIG. 5. Two cables 35 are shown connected to the lever 36 by means of cable screws 37 onto a clamp 38. The lever 36 has three positions provided in slots 39 in plate 40. The three slots 39 represent the three positions of the tab 30 engaging with the cam plate 26. A spring 41 is positioned at the end of the cable 35 pressing against the pivoting arm 27. Thus, if say the fixed position for the tab 30 is selected, the cable is pushed to that position and the spring pushes against the pivoting arm 27 but will not engage into the slot 31 until the wheel 22 and cam plate 26 swivel to the correct position so that the engagement is made.

The seat 21 may have one or two positions. If the vehicle is a wheelchair for a handicapped child then a low seat position is required. The same wheelchair may be used for an adult by placing the seat 21 in the high seat position. The tiller 16 and steering handle 17 may be removed to allow a person to sit on the seat 21 and then replaced so that the front wheel may be steered and driven.

A footrest 50 is provided in front of the vehicle with a front bumper bar 51 attached to the frame 11 extending around the footrest 50 to provide protection to prevent a user's foot from getting hit should the vehicle bump into a wall or other object. In a preferred embodiment the bumper bar 51 is radiused from the central support column 14 supporting the front wheel 13 so that the vehicle can be pivoted about the floor contact point of the front wheel 13 when resting against an obstruction. In another embodiment as illustrated in FIG. 2 an extended footrest 52 with extender bars 53 may be incorporated in the vehicle to extend the footrest. Thus by raising the seat 21 and inserting the extended footrest 52, the wheelchair can be used for an adult, by lowering the seat 21 and removing the extended footrest 52, the wheelchair is suitable for use by a child. Side bumpers 54 are provided on each side of the vehicle extending beyond all the protrusions on the vehicle and ensuring that the side bumpers 54 touch a vertical obstruction before the arm or shoulder of a person in the vehicle. Springs 55 are provided on the side bumpers 54 so that if a side bumper 54 hits an obstruction, then the spring 55 is compressed which absorbs the shock of impact and provides a rebound force to push the vehicle clear of the obstruction. This rebound action occurs when the rear caster wheels 22 are in the free or limited free swivel position. This rebound action adds to the movement of the rear of the vehicle, enhancing the oversteering handling characteristics particularly when used in an amusement or recreational type of vehicle. When used as a wheelchair vehicle, side protector bars 56 are provided either attached to the frame or the seat, extending up to head level on each side of the vehicle, so that the upper body or head of an occupant does not swing into the edge of a table or other overhanging obstruction when manoeuvring in a room or confined space.

Two small front swivel wheels 60 are positioned under the footrest 50 on each side of the front wheel 13. These swivel wheels normally rest above ground level and only touch the ground if a slight tipping of the front of the vehicle occurs. The wheels 60 are free to swivel in all directions and are not normally in contact with the ground unless the vehicle starts to tip.

In a preferred embodiment a torque spring drive comprising one or more torque springs 70 positioned between the drive axle from the gear reducer and the wheel 13 is provided to avoid a jerky start or stop action when the press button 18 is depressed on the steering handle 17.

In operation if the vehicle is to be used as a wheelchair it may be left with the rear caster wheels 22 in the fixed position in which case the vehicle will track in the normal manner. If the wheelchair has the rear caster wheels 22 in the free position, the wheelchair is able to swivel and move in all directions, that is to say it can move sideways as well as forwards or backwards, and thus a person in the wheelchair has access to small spaces which would be almost impossible to enter with a fixed wheel tricycle wheelchair. When in the free mode it may be necessary for a person to move the wheelchair by putting out a hand and pushing or pulling in whatever direction is required. When the vehicle is in the intermediate position it may be used as a fun vehicle for driving around corners and the like. This permits the rear of the vehicle to swing out and not to track in the normal manner which simulates a skidding effect to give an entertaining movement. Thus the vehicle does not tip and is safe for use by children. Children may use this vehicle as a fun vehicle. It may also be used in fun fairs and the like. In some embodiments a special casing is provided to give the vehicle special visual identity such as a rocket ship, a train or a racing car.

In another embodiment the single front wheel 13 may be replaced by two wheels close together, driven by a single drive system. The tiller 16 and steering handle 17 may be replaced by a wheel and if necessary a chain and remote drive position could be provided. Various changes may be made to the vehicle without departing from the scope of the present invention which is limited only by the following claims.

The embodiments of the invention in which an exclusive property or privilege is claimed are defined as follows:

1. A powered vehicle comprising,
at least one steerable central front wheel, the front wheel being steerable at least about 90° on either side of a straight ahead direction,
power means to drive the front wheel in forward and reverse directions,
at least two rear swivel caster wheels forming a tricycle arrangement with the central front wheel, each said caster wheel having a swivel point and an axle offset from said swivel point whereby said caster wheels normally trail said front wheel when the vehicle is going in a straight ahead direction,
means connected with each of the caster wheels to provide a free position wherein each caster wheel is independently free to swivel in any direction, to provide an intermediate position wherein each caster wheel is independently free and unrestrained to swivel from a normal straight ahead direction outwards through an angle of approximately 180° to a reversed straight ahead direction and inwards through an angle of approximately 45°, and to provide a locked position for at least one caster wheel wherein the caster wheel is lockable in the straight ahead direction,
remote control selector means to change between the free position, the intermediate position, and the locked position of the caster wheel, and
spring loaded side bumpers mounted on said vehicle.

2. The vehicle according to claim 1 wherein the free position, intermediate position and locked position of the caster wheel are determined by the remote control selector means.

3. A powered wheelchair for indoor use comprising,
a tricycle frame with a seat and a footrest,
a steerable central front wheel having a tiller steering control handle, the front wheel being steerable at least about 90° on either side of a straight ahead direction,
power means to drive the front wheel in forward and reverse directions,
two swivel rear caster wheels forming a tricycle arrangement with the central front wheel, each said caster wheel having a swivel point and an axle offset from said swivel point whereby said caster wheels normally trail said front wheel when the vehicle is going in the straight ahead direction, and each of the caster wheels having a free position wherein each caster wheel is independently free to swivel in any direction, an intermediate position wherein each caster wheel has an independently free and unrestrained swivel movement from the normal straight ahead direction outwards to an angle of approximately 180° to a reversed straight ahead direction and inwards from the normal straight ahead direction through an angle of approximately 45°, and a locked position wherein each caster wheel is lockable in the straight ahead direction,
remote control selector means to determine the free position, intermediate position and locked position on the two caster wheels,
front bumper bar attached to the tricycle frame extending beyond the foot rest, and
spring loaded side bumpers attached to the tricycle frame.

4. The wheelchair according to claim 3 wherein the front bumper bar is curved representing a radius from the steerable central front wheel.

5. The wheelchair according to claim 3 wherein the seat has at least two height positions.

6. The wheelchair according to claim 3 wherein the footrest has an extension piece to provide additional space and extend the length of the wheelchair.

7. The wheelchair according to claim 3 including at least two additional caster wheels positioned in front of the front wheel, one at each side of the frame, the additional caster wheels being raised above the level of the front wheel and rear caster wheels, adapted to assist in preventing tipping of the wheelchair.

8. The wheelchair according to claim 3 wherein the power means to drive the front wheel includes an electric motor and gear reducer powered by batteries located on the frame beneath the seat, and including a torque spring drive between the gear reducer and the wheel.

* * * * *